(12) United States Patent
Fahrbach et al.

(10) Patent No.: US 12,019,227 B2
(45) Date of Patent: Jun. 25, 2024

(54) OPTICAL DEVICE, OPTICAL MODULE AND MICROSCOPE FOR SCANNING LARGE SAMPLES

(71) Applicant: Leica Microsystems CMS GmbH, Wetzlar (DE)

(72) Inventors: Florian Fahrbach, Mannheim (DE); Werner Knebel, Kronau (DE); Peter Pott, Bruehl/Baden (DE); Wernher Fouquet, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/977,820

(22) PCT Filed: Feb. 20, 2019

(86) PCT No.: PCT/EP2019/054146
§ 371 (c)(1),
(2) Date: Nov. 13, 2020

(87) PCT Pub. No.: WO2019/170413
PCT Pub. Date: Sep. 12, 2019

(65) Prior Publication Data
US 2021/0063714 A1 Mar. 4, 2021

(30) Foreign Application Priority Data
Mar. 5, 2018 (DE) .................. 10 2018 203 247.5

(51) Int. Cl.
*G02B 21/00* (2006.01)
*G01N 21/47* (2006.01)
(Continued)

(52) U.S. Cl.
CPC ......... *G02B 21/0032* (2013.01); *G01N 21/47* (2013.01); *G01N 21/6458* (2013.01);
(Continued)

(58) Field of Classification Search
CPC ............ G02B 21/0032; G02B 21/0064; G02B 21/0076; G02B 21/24; G02B 21/33;
(Continued)

(56) References Cited

U.S. PATENT DOCUMENTS 3,263,070 A 7/1966 Hine
8,574,859 B2 * 11/2013 Lin ...................... A61B 5/0059
435/7.24
(Continued)

FOREIGN PATENT DOCUMENTS

DE 102017116892 A1 2/2018
EP 1 136 813 A2 9/2001
(Continued)

*Primary Examiner* — David P Porta
*Assistant Examiner* — Mamadou Faye
(74) *Attorney, Agent, or Firm* — LEYDIG, VOIT & MAYER, LTD.

(57) ABSTRACT

An optical device for illuminating a sample located in a sample volume with illumination light and for detecting scattered and/or fluorescent light from the sample includes an optical illumination assembly, an optical detection assembly and at least one attachment element. The optical illumination assembly is configured to transmit the illumination light along an illumination path into the sample volume. The optical detection assembly is configured to collect and relay the scattered and/or fluorescent light from the sample volume along a detection path. At least portions of the illumination path and/or of the detection path extend in the at least one attachment element.

23 Claims, 4 Drawing Sheets

(51) Int. Cl.
*G01N 21/64* (2006.01)
*G02B 21/24* (2006.01)
*G02B 21/33* (2006.01)

(52) U.S. Cl.
CPC ..... *G02B 21/0064* (2013.01); *G02B 21/0076* (2013.01); *G02B 21/24* (2013.01); *G02B 21/33* (2013.01); *G01N 2201/0633* (2013.01)

(58) Field of Classification Search
CPC .... G02B 21/06; G01N 21/47; G01N 21/6458; G01N 2201/0633; G01N 21/4795
See application file for complete search history.

(56) References Cited

U.S. PATENT DOCUMENTS

| | | | | |
|---|---|---|---|---|
| 10,409,052 | B2* | 9/2019 | Liu | G02B 27/0075 |
| 10,605,733 | B1* | 3/2020 | Wu | G01N 21/6458 |
| 2002/0060301 | A1 | 5/2002 | Probst | |
| 2003/0186227 | A1* | 10/2003 | Balasubramanian | C12Q 1/6837 435/7.1 |
| 2009/0159812 | A1* | 6/2009 | Livingston | G01N 21/645 250/428 |
| 2009/0273774 | A1* | 11/2009 | Sieracki | G02B 21/16 356/73 |
| 2013/0335818 | A1* | 12/2013 | Knebel | G01N 21/6458 359/385 |
| 2014/0353522 | A1* | 12/2014 | Wu | G01N 15/1434 250/458.1 |
| 2016/0252719 | A1* | 9/2016 | Liu | G01N 33/4833 348/49 |
| 2017/0160531 | A1 | 6/2017 | Knebel | |
| 2017/0293130 | A1* | 10/2017 | Huang | B01L 3/5027 |
| 2017/0336612 | A1* | 11/2017 | Foley, IV | G02B 21/33 |
| 2018/0052314 | A1 | 2/2018 | Brinkman et al. | |

FOREIGN PATENT DOCUMENTS

| | | | |
|---|---|---|---|
| JP | 2004-279910 A | 10/2004 | |
| JP | 2017522603 | 8/2017 | |
| JP | 2018032009 A | 3/2018 | |
| WO | WO-2016054474 A1 * | 4/2016 | ............ B01L 3/5027 |

* cited by examiner

OPTICAL DEVICE, OPTICAL MODULE AND MICROSCOPE FOR SCANNING LARGE SAMPLES

CROSS-REFERENCE TO PRIOR APPLICATIONS

This application is a U.S. National Phase Application under 35 U.S.C. § 371 of International Application No. PCT/EP2019/054146, filed on Feb. 20, 2019, and claims benefit to German Patent Application No. DE 10 2018 203 247.5, filed on Mar. 5, 2018. The International Application was published in German on Sep. 12, 2019 as WO 2019/170413 A1 PCT Article 21(2).

FIELD

The invention relates to an optical device for illuminating a sample located in a sample volume with illumination light and for detecting scattered and/or fluorescent light from the sample, the device including an optical illumination assembly for transmitting the illumination light along an illumination path into the sample volume, and an optical detection assembly for collecting and relaying the scattered and/or fluorescent light from the sample volume along a detection path.

The invention also relates to an optical module and a microscope, in particular a confocal microscope, including a mechanical holding device for optical modules.

BACKGROUND

Prior art optical devices such as are used for light-sheet microscopes, for example, are not suitable for scanning large samples because of the preferred geometric configuration of a light-sheet microscope; i.e., the perpendicular orientation of the illumination assembly and detection assembly relative to each other. In prior art approaches, a sample is illuminated from the side, for example, and particularly preferably by a light sheet, and the scattered and/or fluorescent light emitted from the sample is, in particular, detected perpendicularly thereto. The illumination assembly may limit a possible mechanical positioning movement of the sample.

SUMMARY

In an embodiment, the present invention provides an optical device for illuminating a sample located in a sample volume with illumination light and for detecting scattered and/or fluorescent light from the sample. The optical device includes an optical illumination assembly, an optical detection assembly and at least one attachment element. The optical illumination assembly is configured to transmit the illumination light along an illumination path into the sample volume. The optical detection assembly is configured to collect and relay the scattered and/or fluorescent light from the sample volume along a detection path. At least portions of the illumination path and/or of the detection path extend in the at least one attachment element.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
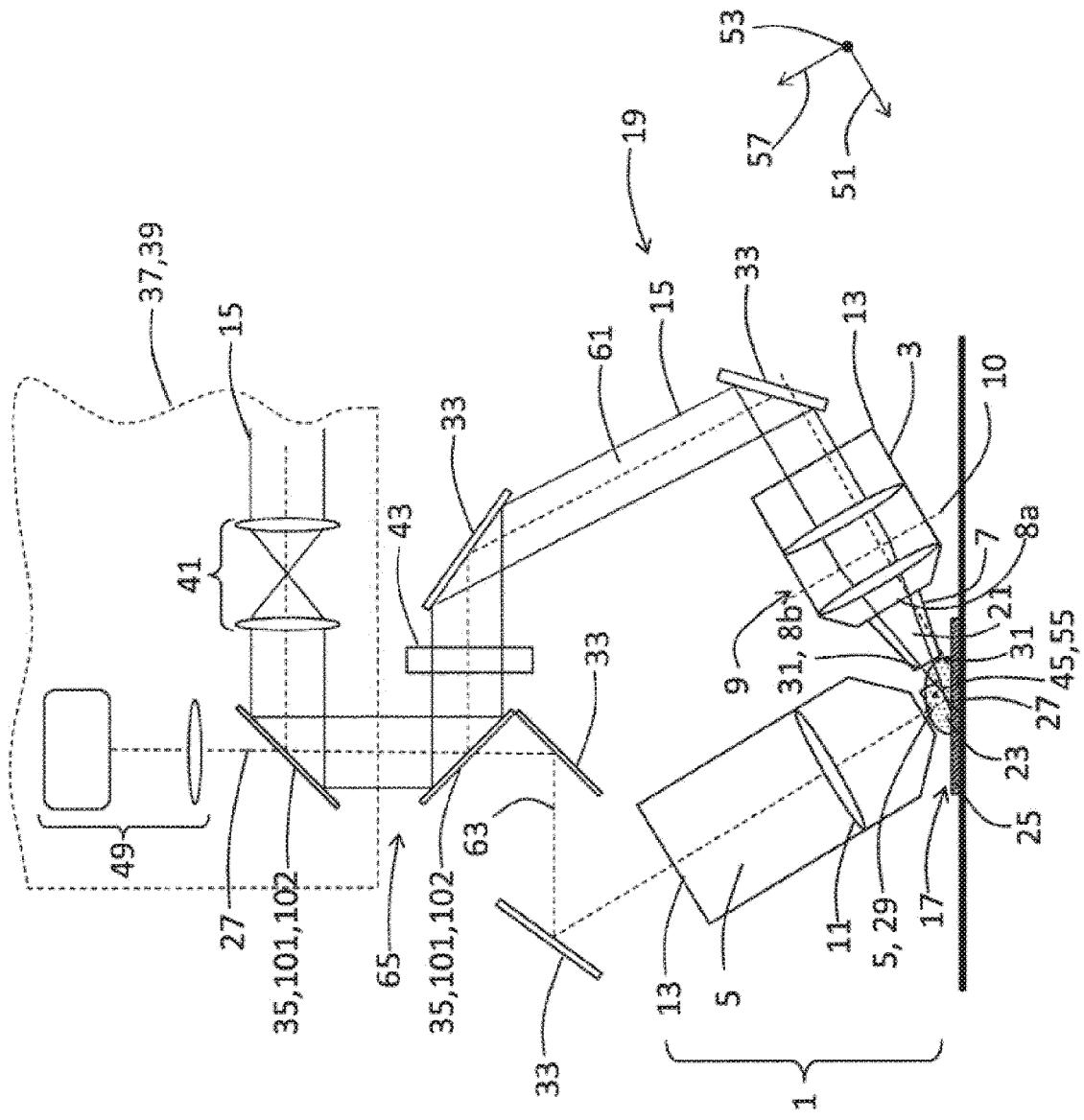
FIG. 1 shows a first embodiment of the optical assembly according to the invention.

Embodiments of the present invention provide a compact optical device, a compact optical module, and a microscope which allow for scanning of large samples.

The optical device according to an embodiment of the present invention allows for scanning of large samples by having at least one attachment element in which at least portions of the illumination path and/or of the detection path extend. The optical module according to an embodiment of the invention allows for scanning of large samples by having an optical device according to an embodiment of the invention, and the microscope according to an embodiment of the present invention allows for scanning of large samples by having an inventive optical module held therein in the holding device according to an embodiment of the present invention. The attachment element makes it possible to modify the orientation or the spacing of the illumination and/or detection optics from the sample volume, which allows for a more flexible and more compact design of the optical device. In this regard, the attachment element may have a beam-deflecting property. Furthermore, the approaches of embodiments of the invention allow examination of sample sections since, with the attachment element, the solid angle subtended by the optical illumination assembly and the optical detection assembly is <180°.

The optical device, the optical module, and the microscope may be further improved by the embodiments described below, each of which is advantageous in itself. The technical features of the embodiments may be combined or omitted as desired, unless the technical effect achieved by the omitted feature is essential.

The optical illumination assembly and/or the optical detection assembly may include a plurality of individual lenses; i.e. a lens system. Such a design allows easy access and replacement of the optical components and provides a high degree of flexibility. In particular, the illumination assembly and/or the detection assembly may each take the form of an objective. The illumination path may be defined by the optical elements of the illumination assembly, and in particular may terminate in the sample volume or in the sample. Similarly, the detection path may be defined by the optical elements of the detection assembly and may also terminate in the sample volume.

The terms "illumination path" and "detection path" refer specifically to the transmission paths that are arranged on a sample side of the illumination assembly and on the sample side of the detection assembly, respectively. The optical paths that extend on the side of the illumination assembly opposite to the sample and on the side of the detection assembly opposite to the sample, respectively, are not encompassed by these terms.

Further, illumination light which passes through a sample or through a sample volume without a sample may also propagate along an optical path on the other side of the sample volume. This optical path is also not understood herein to be part of the illumination path.

Thus, the attachment element is preferably disposed on the sample side of the illumination assembly and the detection assembly. The attachment element may be a body which is transparent to the light used and in which the light (illumination light and/or scattered and/or fluorescent light) is transmitted.

The light used is preferably light in the ultraviolet, visible and near infrared spectral regions. For instance, the light used for illumination may include, for example, an ultraviolet excitation wavelength of a fluorescent material, and the fluorescent light may include wavelengths in the longwave visible spectral region or in the near-infrared spectral region. Consequently, the illumination assembly is optimized for the ultraviolet spectral region, and the detection assembly is optimized for the near-infrared spectral region. The deflecting element may preferably be disposed only in the illumination path and may be optimized for the ultraviolet spectral region.

The attachment element may be designed such that either both the illumination path and the detection path or only the illumination path or only the detection path extend(s) therein.

In a possible embodiment, the attachment element may have an input-side optical cross section and an output-side optical cross section, and the input-side optical cross section may be greater than the output-side optical cross section. Such a cross section is to be understood to be an area that is usable for the transmission of light.

The attachment element may have the shape of, for example, a truncated one or a truncated pyramid.

The optical device may be further improved by attaching the attachment element to the optical illumination assembly and/or to the optical detection assembly. Consequently, the attachment element is movable along with a respective one of the optical assemblies or with both assemblies.

Such a design has the advantage of, for example, increased stability during illumination/viewing of the sample in a liquid medium, without having to immerse the optical assemblies themselves. This avoids contact of the usually expensive optical assemblies with unknown or unwanted liquids.

In another advantageous embodiment, at least the detection assembly may be an immersion optic. The illumination assembly may also be an immersion optic.

The illumination assembly may preferably have a greater working distance than the detection assembly, so that the illumination assembly may be positioned at a greater distance from the sample volume than the detection assembly. Moreover, it is possible to use illumination assemblies which have a lower numerical aperture (NA) than the detection assembly. The lower NA may enable a more slender; i.e., smaller design, and thus further reduce mechanically limited angles during positioning of the illumination assembly and the detection assembly.

If an immersion optic is used as the detection assembly, then this immersion optic is immersed with its sample-side end, in particular with a front face of an optical element, in an immersion medium. In an advantageous embodiment, the attachment element is located in the illumination path and is immersed in the immersion medium, the attachment element protruding from the immersion medium.

It should be noted at this point that an "immersion medium" is understood to be the medium which is located between the attachment element and the sample and in which the sample is embedded. The position of the immersion medium is not explicitly limited to the area between the optical assembly in a cover slip, but also includes the medium surrounding the sample.

The illumination path preferably enters the attachment element from outside the immersion medium and preferably exits the attachment element in the immersion medium. Therefore, the illumination path is not affected by any disturbances resulting from an agitated surface of the immersion medium.

During the scanning of the sample, the illumination assembly can thus illuminate the sample in an undisturbed manner without the need to wait until the surface agitation of the immersion medium calms down.

Consequently, airborne vibrations, which can disturb the surface of the immersion medium, do not affect the illumination or the detection either.

The attachment element may be cup-shaped, opening toward the illumination assembly. Compared to an attachment element made of solid material, a cup-shaped attachment element is lighter in weight, and thus may contribute to a faster possible scanning movement. The advantage is in particular that the optical path length (product of the refractive index and the distance in the material of the attachment element) is not significantly changed, which eliminates the need to adapt the optical assembly.

In another advantageous embodiment, the attachment element may have a transparent element toward the sample volume. This transparent element may be a window and may be transparent in particular to the illumination light and/or to the scattered and/or fluorescent light. In particular, it is advantageous if the transparent element is oriented perpendicular to the illumination beam path or to the detection beam path, respectively. The orientation perpendicular to a beam path has the advantage of reducing aberrations caused by oblique incidence of the beam on a refractive index interface.

The cup-shaped attachment element may preferably be placed in the illumination path and may be immersed with a cup bottom or bottom surface in the immersion medium. At least a portion of the attachment element or the entire attachment element may have an optical refractive index that is matched to the optical refractive index of the sample or of the medium surrounding the sample.

The attachment element of the optical device may have at least two interfaces which are oriented substantially perpendicular to the illumination path and/or to the detection path. This is advantageous, especially when the light to be transmitted includes multiple wavelengths or is broadband.

Perpendicular passage of the light through the interfaces avoids wavelength-dependent angular separation (angular dispersion) caused by material dispersion. When using monochromatic light for illumination, the incidence of light into the material of the attachment element may also differ from perpendicular incidence. However, in this connection, it should be observed that the passage of a focused light beam through an oblique interface leads to aberrations (coma, etc.) if the diffractive index of the material is different on the two sides of the interface. It is therefore an important criterion in this context whether the refractive index of the attachment element is matched to the sample/immersion medium.

Such matching can be achieved by another advantageous embodiment of the inventive optical device, in which the cup-shaped attachment element may be filled with another optical medium. For instance, the attachment element may be filled, for example, with another optical medium whose refractive index corresponds to that of the material of the attachment element. Moreover, the further optical medium may be the medium of the attachment element, so that, in other words, a solid attachment element is obtained which is completely made of one material.

The cup-shaped attachment element may also be configured as a chamber. The object-side input face to the chamber is preferably transparent and may in particular be perpendicular to the optical axis of the optical assembly. The volume of the chamber may now, for example, be filled with the immersion medium. It is possible, of course, to use any other medium, such as a mixture in which the refractive index can be significantly changed via the concentration of a component. The advantage then is that the passage of the light from the optical assembly into the sample medium occurs at the input face to the attachment element, where the interface is already perpendicular to the optical axis. Thus, aberrations are minimized. Exit may, in principle, be at any angle, provided there is no sudden change in the refractive index. Thus, the front interface no longer necessarily has to be oriented perpendicular to the optical axis, for example, when the space available for the sample can thereby be increased. However, with regard to possible imaging errors, it may be advantageous to orient the sample-side window of the chamber perpendicular to the optical axis of the optical assembly.

If the attachment element that is completely made of one material is mounted in front of the optical assembly, then it is advantageous if the entrance and exit faces are perpendicular to the optical axis of the optical assembly. If an attachment element made of a single material includes a material having a higher refractive index than air (a refractive index>1 or more preferably a refractive index>1.33), then such an attachment element increases the working distance of the optical assembly due to the refraction at the entrance face. This can be used to advantage because it allows the optical assembly to be positioned even further back with respect to the sample so as to avoid collision with another optical assembly. Also, since the optical illumination assembly and the optical detection assembly can be spatially separated from each other, it is possible to select a smaller angle therebetween.

The two interfaces of the cup bottom (one facing the illumination assembly and the other facing the sample volume) may therefore also be oriented perpendicular to the illumination path, so that no wavelength-dependent angular dispersion occurs when the illumination light passes through the bottom of the cup.

In a further embodiment, the attachment element of the optical device may be a deflecting element that deflects the illumination light and/or the scattered and/or fluorescent light. This has the advantage that the optical axes of the illumination assembly and the detection assembly do not need to be oriented perpendicular to each other, but rather an angle less than 90° can be selected. The deflection of the light by the deflecting element may occur near one assembly (illumination or detection). The second assembly (detection or illumination) may be positioned further back from the sample volume; i.e., disposed further away from the sample volume.

Since an optical assembly preferably extends rotationally symmetrically about the respective transmission path, for example in the form of holders and housing parts of the optical elements, the smallest possible angle between the illumination assembly and detection assembly may be limited by these housing parts.

Positioning one assembly further back with respect to the other assembly may moderate this geometric limitation, so that the two assemblies may be oriented at a smaller angle relative to each other. Only the respective transmission path of the assembly that is positioned back passes through the assembly that is not positioned back, and may be deflected in the deflecting element in such a manner that the illumination path is preferably oriented perpendicular to the detection path.

In another advantageous embodiment, in the deflecting element, a transmission path for the illumination light and/or the scattered and/or fluorescent light may be oriented at an acute glancing angle with respect to a side face of the deflecting element. The conditions for total internal reflection may be satisfied for the side face and the transmitted light.

Thus, deflection may be brought about in a simple manner merely by way of the selection of the geometry of the deflecting element.

The glancing angle is defined as the angle between the incident light (along the respective transmission path) and the surface of the side face. The glancing angle is the angle that complements the angle of incidence to 90°.

The conditions for the occurrence of total internal reflection are known in the art and include, for example, the transition from an optically dense to an optically less dense medium.

In particular, when an immersion medium is used, the difference between the refractive index of the material of the deflecting element and the refractive index of the immersion medium may be too low to enable total internal reflection at the desired glancing angle. In such a case, the side face is preferably provided with a coating that is reflective to the incident light. Such a coating may be a vapor-deposited metal or a dielectric coating. In particular, a dielectric coating may be optimized for a predetermined glancing angle and the wavelength of light used.

The attachment element that is in the form of a deflecting element also has the two interfaces that are oriented substantially perpendicular to the illumination path and/or to the detection path. This ensures that the deflecting element does not introduce any angular dispersion and that the deflection is solely based only a reflection.

In particular, such a deflecting element may also protrude from the immersion medium, the illumination light entering the deflecting element from outside the immersion medium and exiting the deflecting element within the immersion medium. In order to avoid Fresnel reflections at the interfaces, the interfaces may be provided with antireflection coatings thereon.

Since a sample may be located entirely within the immersion medium, the sample can be viewed through the detection assembly, which is also at least partially immersed in the immersion medium.

In this process, the sample can be moved; i.e., scanned, by means of the translation table. Although such scanning may in fact induce disturbances in the surface of the immersion medium, such disturbances lead neither to disturbances in the illumination nor in the detection.

Further, the interfaces oriented perpendicular to the respective transmission path do no introduce any distortions into the illumination light or into the scattered and/or fluorescent light.

The scanning may in particular be performed over a distance of several centimeters, which enables microscopic examination of large brain sections, for example. Also possible are three-dimensional cell clusters (organoids) in localized volumes (called "wells"), which extend over several hundred µm in the spatial directions.

Since, in contrast to confocal microscopy, the area of a light sheet; i.e., for example, an area of 500 µm times 500 µm, can be detected in a single step, and not just a diffraction-limited point, an area and not just a point is scanned in one scanning step, which allows the large-area object to be quickly examined microscopically. An oblique light sheet can allow a penetration depth of up to about 300 µm in the examination of an unclarified sample. In the case of a clarified, i.e., chemically treated (cleared) sample, the penetration depth may be up to several millimeters.

The illumination of the sample may be provided by means of a so-called static light sheet, which is preferably generated by a cylindrical lens. In transparent or semi-transparent samples, a light sheet illuminates a cross section; in the case of non-transparent objects, only that portion of the periphery of the object which is reached by the illumination light is illuminated.

It is also possible to generate a so-called virtual light sheet. To do this, focused illumination light is (preferably) periodically scanned by a scanning device (e.g., a scanning mirror) along a direction perpendicular to the propagation direction. The frequency of scanning is preferably greater than an image acquisition frequency.

Scanning of a sample and detecting the scattered and/or fluorescent light emitted therefrom results in a stack of suitable sections through the sample, which allow for a three-dimensional reconstruction.

The attachment element may preferably be attached to the illumination assembly and/or to the detection assembly, so that once adjusted, the deflecting element does not need to be adjusted later.

The optical module according to the invention includes an inventive optical device and may be provided with an entry/exit opening for, and shared by, the illumination light and the scattered and/or fluorescent light. Such a shared opening can allow the inventive module to be held in a holding device of a microscope.

Confocal microscopes in particular may have a collinearly extending transmission path for the illumination light and the scattered and/or fluorescent light, so that when the optical module is attached, illumination light emitted from the microscope is transmitted in the module through the illumination assembly to the sample volume via the illumination path.

Similarly, scattered and/or fluorescent light emitted from the sample volume, specifically from a sample located therein, is supplied along the detection path through the optical detection assembly and through the shared opening to the microscope, where it can be detected.

Therefore, the optical module may be understood to be a retrofit kit that allows light-sheet microscopy to be performed using a confocal microscope. Simple and fast removal of the optical module allows the confocal microscope to be used for confocal microscopy again.

Both the illumination assembly and the detection assembly can be mechanically fixed to the module and in particular be replaceable by means of an adapter block. It is also conceivable that the individual optical elements of the illumination assembly or detection assembly may be separately disposed and mounted in the optical module, and may thus be replaceable in a variable manner.

The optical module may further include an actuator that makes it possible to vary the distance of the module from the sample, and to thereby adjust the position of the light sheet to be formed; i.e. the sample plane. Further, the module may alternatively use actuators already provided in a microscope.

In a further embodiment of the inventive optical module, at least one wavelength-selective optical element may be provided for combining the transmission paths of illumination and detection, the wavelength-selective optical element having transmission and/or reflection properties for the illumination light that differ from the transmission and/or reflection properties of the fluorescent light.

The wavelength-selective optical element may be a dichroic mirror or a partial reflector. It is also conceivable to design the inventive module as a confocal illumination and/or detection module by removing a splitter element (dichroic splitter 101, 102, 35).

An inventive optical module can be held in the inventive microscope by means of the mechanical holding device. This is preferably accomplished by means of a standardized mechanical holding device which is adapted, on the one hand, to mechanically hold the optical module in the microscope in a firm and secure manner and, on the other hand, to precisely align the optical module with respect to the transmission paths of the microscope by way of a holding mechanism.

The present invention will now explained in more detail with reference to exemplary embodiments, each of the embodiments being advantageous in itself. The technical features of the illustrated embodiments may be combined or omitted as desired. Identical technical features and technical features having the same function or technical effect are provided with the same reference numerals.

FIG. 1 shows an optical device 1 including an optical illumination assembly 3, an optical detection assembly 5, and an attachment element 7. Optical illumination assembly 3 includes a schematically shown lens system 9 having an image-side principal plane 10, whereas optical detection assembly 5 includes a single lens 11. Optical illumination assembly 3 and optical detection assembly 5 are both shown with a housing 13. In other embodiments, only lens systems 9 or individual lenses 11 may be disposed in optical device 1.

Optical illumination assembly 3 transmits illumination light 15, which is directed from an instrument side 19 to a sample side 17, where it is transmitted along an illumination path 21 through a sample volume 23. A sample 25 is at least partially contained in sample volume 23.

Scattered and/or fluorescent light 27 originating from sample 25 is transmitted through sample volume 23 along a detection path 29 to optical detection assembly 5 and is collected by optical detection assembly 5 and relayed to instrument side 19.

Attachment element 7 is cup-shaped and has two interfaces 31 oriented perpendicular to illumination path 21. In sample 25, illumination path 21 and detection path 29 are oriented substantially at an angle of 90° relative to each other. The two interfaces 31 have an output-side optical cross section 8*b*, which limits the size of the light beam passing therethrough.

In the embodiment shown, output-side optical cross section 8*b* is smaller than an input-side optical cross section 8*a* facing the optical illumination assembly. If attachment element 7 is associated with an optical detection assembly 5, then these cross sections 8*a*, 8*b* are defined analogously.

A plurality of deflecting mirrors 33 and dichroic mirrors 35 are depicted on instrument side 19. Dichroic mirrors 35 are special forms of wavelength-selective optical elements 101 which have different transmission and/or reflection properties 102 for illumination light 15 and scattered and/or fluorescent light 27.

FIG. 1 also schematically shows that portion of a microscope 37 which, in the embodiment shown, is a confocal microscope 39. The confocal microscope includes, for example, an optic 41 which collimates illumination light 15 and directs it to a cylindrical lens 43 via the two dichroic mirrors 35.

In cylindrical lens 43, illumination light 15 is focused only in one direction, so that a light sheet 45 is formed in sample 25. The light sheet is shown clearly in enlargements 47 in FIG. 4.

Thus, scattered and/or fluorescent light 27 is emitted perpendicularly to light sheet 45 and directed along detection path 29 to optical detection assembly 5. Optical detection assembly 5 transmits the scattered and/or fluorescent light 27 to a detector system 49 of microscope 37 via two deflecting mirrors 33 and through the two dichroic mirrors 35.

The light sheet 45 being formed extends along a propagation direction 51 which, in the exemplary embodiment shown, is oriented parallel to illumination path 21 and along a width direction 53, which extends into the plane of the drawing. Further, light sheet 45 has a thickness 55 measured along a thickness direction 57. Thickness direction 57 and detection path 29 are parallel to each other.

Both the illumination path 21 and the detection path 29 may be referred to as transmission paths 59. To distinguish between the paths between sample side 17 and instrument side 19, the paths on the instrument side are referred to as input path 61 and output path 63, respectively.

In a flange region 65, both the input path 61 and the output path 63 extend collinearly.

Figure 2:
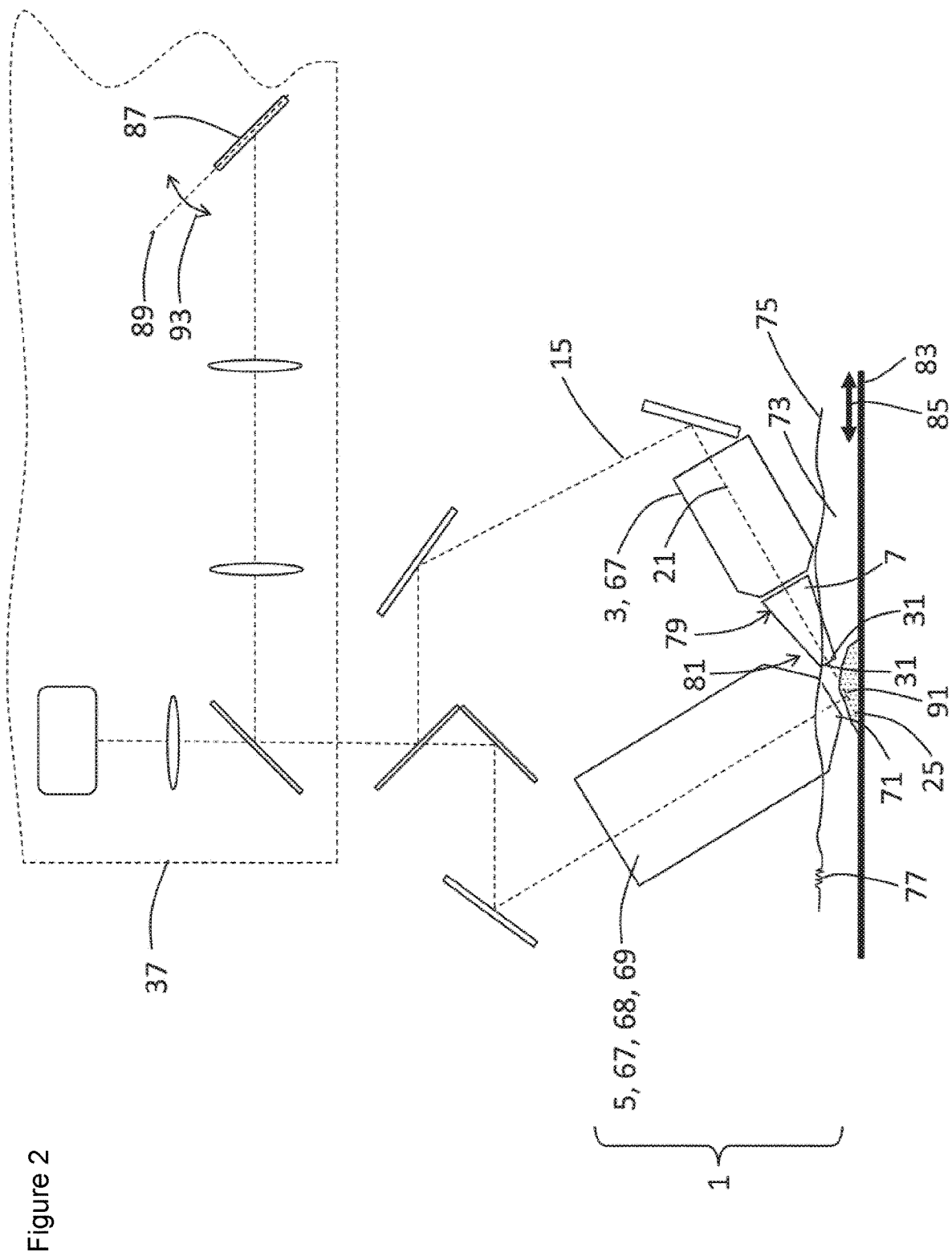
FIG. 2 shows a second embodiment of the optical assembly according to the invention.

The operating principle of attachment element 7 is illustrated in FIG. 2. The optical device 1 of FIG. 2 includes an optical illumination assembly 3 and an optical detection assembly 5, each configured as an objective 67. Optical detection assembly 5 is in particular designed as an immersion optic 68 and, in the embodiment shown in FIG. 2, as an immersion objective 69, which is completely immersed with a front 71 in an immersion medium 73. In contrast, optical illumination assembly 3 is located only partially below a surface 75 of immersion medium 73.

In order to prevent vibrations which may develop at surface 75 from disturbing illumination path 21 and fluctuations in the illumination by means of illumination light 15, attachment element 7 is provided. The first end 79 of attachment element 7 is located above surface 75 of immersion medium 73, whereas the second end 81 thereof is located below surface 75 of immersion medium 73.

Cup-shaped attachment element 7 is not filled with immersion medium 73 and allows sample 25 to be illuminated in an undisturbed manner through interfaces 31.

In other embodiments (not shown), attachment element 7 may be filled with another optical medium or be solid to provide matching to the refractive index of the sample and/or of the immersion medium.

Vibrations 77 may occur in particular at surface 75 of immersion medium 73 when a sample holder 83 on which sample 25 is located is moved along one of two possible scanning directions 85.

In contrast to microscope 37 of FIG. 1, microscope 37 of FIG. 2 has a scanning mirror 87 which is mounted so as to be movable about an axis 89 and forms a so-called virtual light sheet 91 in sample 25 by means of a scanning movement 93.

Figure 3:
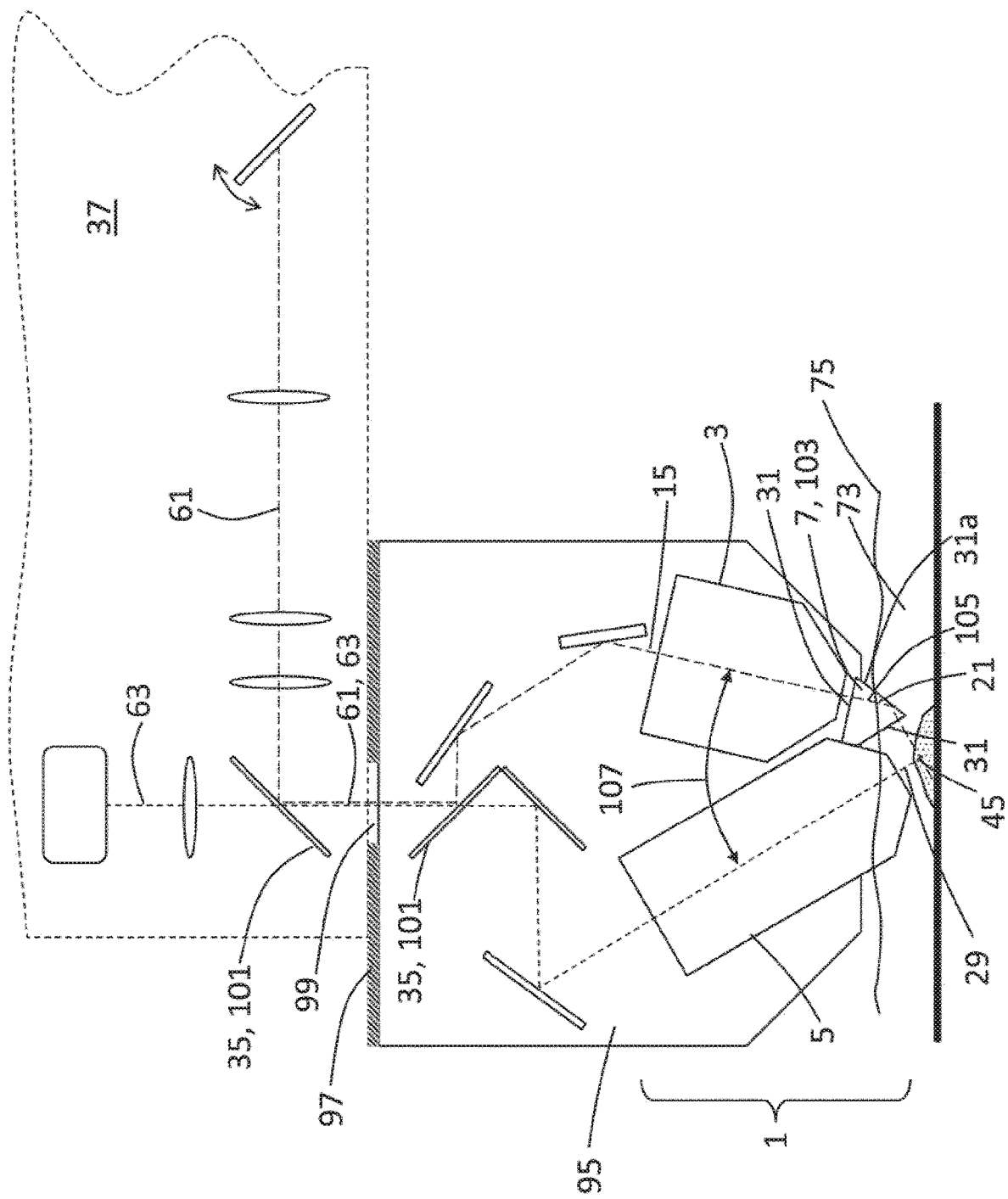
FIG. 3 shows an optical module according to an embodiment of the invention.

FIG. 3 shows a further embodiment of the inventive optical device 1, which is accommodated in an optical module 95.

Such an optical module 95 may be held in microscope 37 by means of a suitable holding device 97 and may optionally include a confocal scanner. Both the holding device 97 and the module 95 have a shared entry/exit opening 99 formed therein through which both the input path 61 and the output path 63 extend collinearly.

This is achieved by previously described dichroic mirrors 35, which constitute a special form of wavelength-selective optical elements 101.

In the embodiment of optical device 1 shown in FIG. 3, attachment element 7 takes the form of a deflecting element 103.

Deflecting element 103 includes interfaces 31 and side faces 31a.

One interface 31 (the one located above surface 75 of immersion medium 73) is oriented perpendicular to illumination path 21, whereas the interface 31 located in immersion medium 73 is oriented at an angle not equal to 90° relative to illumination path 21.

The illumination light 15 transmitted through deflecting element 103; i.e., transmitted light 105, is reflected at a side face 31a and forms light sheet 45, which is oriented perpendicular to detection path 29.

However, in contrast to the previously illustrated embodiments, illumination assembly 3 and detection assembly 5 are arranged relative to each other at an alignment angle 107 that is significantly less than 90°.

Figure 4:
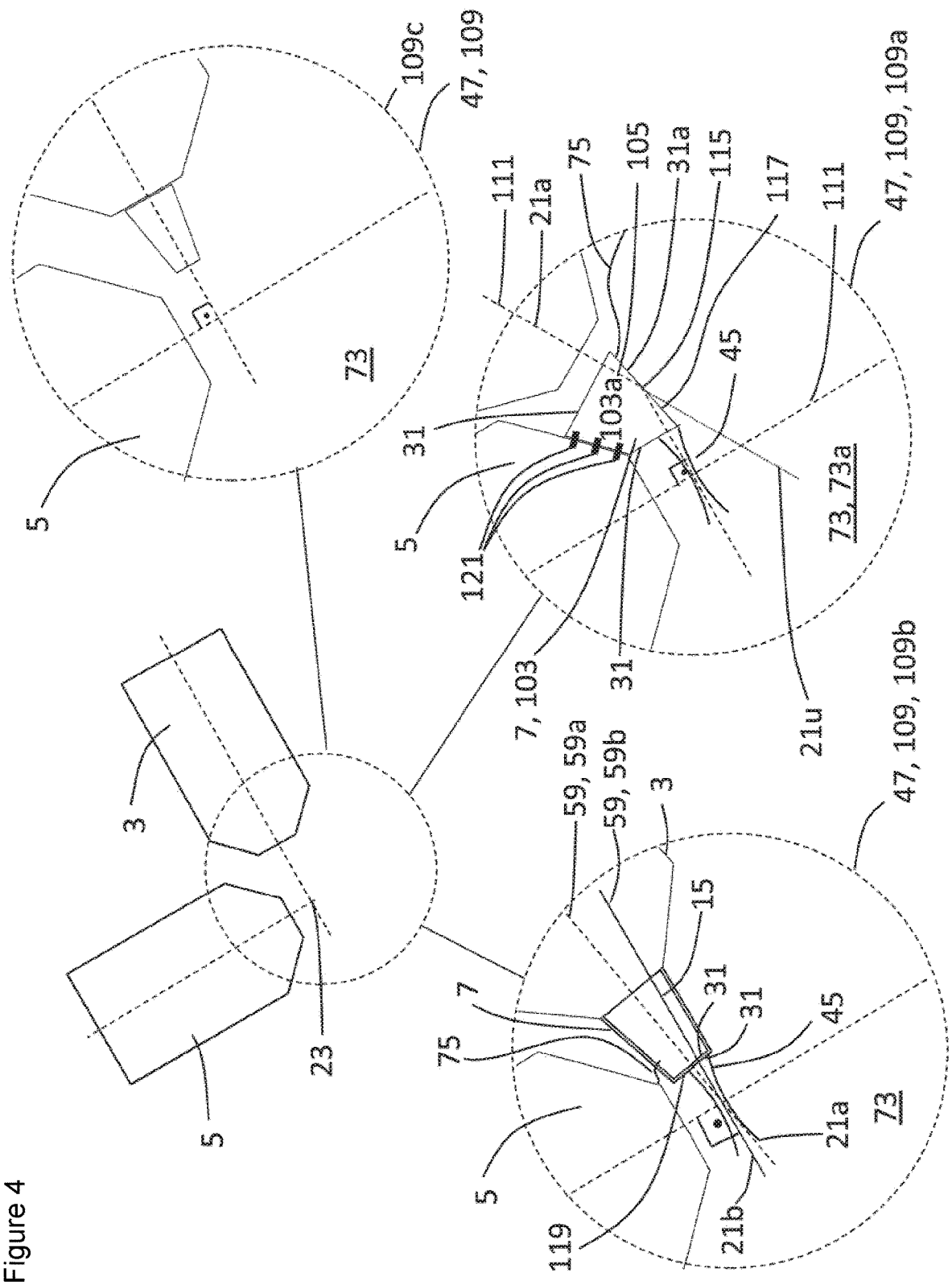
FIG. 4 shows the inventive optical device in two different configurations.

In FIG. 4, the inventive optical device 1 is shown in different configurations 109.

Configurations 109 relate in particular to differently extending transmission paths 59, which result in differing illumination paths 21.

FIG. 4 shows a paraxial transmission path 59a and a peripheral transmission path 59b, which result in a paraxial illumination path 21a and a peripheral illumination path 21b.

A configuration for paraxial illumination 109a with a deflecting element and with an attachment element without deflection action, as well as a configuration for peripheral illumination 109b are illustrated in the two enlargements 47.

In the configuration for paraxial illumination 109a, paraxial illumination path 21a is collinear with an optical axis 111 of optical illumination assembly 3 and enters the attachment element 7 in the form of deflecting element 103 through interface 31.

In the illustrated configuration 109a, deflecting element 103 is attached to optical detection assembly 5 by means of suitable fastening elements 121, but in other embodiments, it may also be attached to optical illumination assembly 3.

Transmitted light 105 impinges on a side face 31a and forms a glancing angle 113 therewith. At side face 31a, total internal reflection 115 may occur, or a reflective coating 117 may be provided which reflects transmitted light 105.

In FIG. 4, reflective coating 117 is shown schematically below the position of total internal reflection 115. Real applications generally use either total internal reflection 115 or a reflective coating 117 to deflect transmitted light 105 and paraxial illumination path 21a. In these considerations, both the glancing angle 113 and the refractive index 103a of deflecting element 103 and the refractive index 73a of immersion medium 73 have to be taken into account because if the refractive indices 73a, 103a are similar in magnitude, it may be impossible to achieve total internal reflection 115 at the desired glancing angle 113.

As a result of the deflection in deflecting element 103, the further paraxial illumination path 21a extends substantially perpendicularly to optical axis 111 of optical detection assembly 5.

An unaltered illumination path 21u, plotted with a dotted line, does not intersect optical axis 111 of optical detection assembly 5 at a right angle.

In the configuration for peripheral illumination 109b, illumination light 15 is not radiated collinearly into illumination assembly 3, so that, unlike the configuration for paraxial illumination 109a, peripheral illumination path 21b does not coincide with optical axis 111 of optical illumination assembly 3.

Illumination light 15 is transmitted along peripheral illumination path 21b in cup-shaped attachment element 7 and passes perpendicularly through the two interfaces 31 of a bottom surface 119 of attachment element 7.

As a result of this perpendicular orientation, no angular dispersion occurs at the transition from attachment element 7 to immersion medium 73.

Due to the non-collinear incidence into optical illumination assembly 3, peripheral illumination path 21b is already oriented substantially perpendicular to optical axis 111 of optical detection assembly 5 without any deflection.

In configuration 109c, attachment element 7 is solid; i.e., in the form of a volume body 123. This embodiment provides the advantage of allowing a distance between the front of the optical assembly and the sample to be increased While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 optical device
3 optical illumination assembly
5 optical detection assembly
7 attachment element
8a input-side optical cross section
8b output-side optical cross section
9 lens system
10 image-side principal plane
11 lens
13 housing
15 illumination light
17 sample side
19 instrument side
21 illumination path
21a paraxial illumination path
21b peripheral illumination path
21u unaltered illumination path
23 sample volume
25 sample
27 scattered and/or fluorescent light
29 detection path
31 interface
31a side face
33 deflecting mirror
35 dichroic mirror
37 microscope
39 confocal microscope
41 optic
43 cylindrical lens
45 light sheet
47 enlargement
49 detector system
51 propagation direction
53 width direction
55 thickness
57 thickness direction
59 transmission path
59a paraxial transmission path
59b peripheral transmission path
61 input path
63 output path
65 flange region
67 objective
68 immersion optic
69 immersion objective
71 front
73 immersion medium
73a refractive index of the immersion medium
75 surface
77 vibrations
79 first end
81 second end
83 sample holder
85 scanning direction
87 scanning mirror
89 axis
91 virtual light sheet
93 scanning movement
95 optical module
97 holding device
99 entry/exit opening
101 wavelength-selective optical element
102 transmission and/or reflection properties
103 deflecting element
103a refractive index of the deflecting element
105 transmitted light
107 alignment angle
109 configuration
109a configuration for paraxial illumination 109b configuration for peripheral illumination
111 optical axis
113 glancing angle
115 total internal reflection
117 reflective coating
119 bottom surface
121 fastening element
123 volume body

The invention claimed is:

1. An optical device for illuminating a sample located in a sample volume with illumination light and for detecting scattered and/or fluorescent light from the sample, the device comprising:
   an optical illumination assembly comprising one or more first lenses and configured to transmit the illumination light along an illumination path into the sample volume;
   an optical detection assembly comprising a second lens that is separate from the one or more first lenses, the optical detection assembly being configured to collect and relay the scattered and/or fluorescent light from the sample volume along a detection path; and
   at least one attachment disposed along the illumination path between the optical illumination assembly and the sample volume, and/or along the detection path between the optical detection assembly and the sample volume,
   wherein the attachment has an input-side optical cross section and an output-side optical cross section, the input-side optical cross section being greater than the output-side optical cross section, and
   wherein the illumination path and the detection path terminate at the sample volume, and the detection path and the illumination path are not collinear with respect to each other.

2. The optical device as recited in claim 1, wherein at least the optical detection assembly is an immersion optic.

3. The optical device as recited in claim 1, wherein the attachment has at least two interfaces which are oriented substantially perpendicular to the illumination path and/or to the detection path.

4. The optical device as recited in claim 1, wherein the attachment is a deflector that deflects the illumination light and/or the scattered and/or fluorescent light.

5. The optical device as recited in claim 4, wherein, in the deflector, a transmission path for the illumination light and/or the scattered and/or fluorescent light is oriented at an acute glancing angle with respect to a side face of the deflector, wherein conditions for total internal reflection are satisfied for the side face and the transmitted light.

6. The optical device as recited in claim 5, wherein the side face has a reflective coating for the light.

7. The optical device as recited in claim 1, wherein the attachment is cup-shaped and opens toward the optical illumination assembly.

8. The optical device as recited in claim 7, wherein the attachment has a transparent element toward the sample volume.

9. The optical device as recited in claim 7, wherein the attachment is filled.

10. An optical module comprising the optical device according to claim 1.

11. The optical module as recited in claim 10, wherein the optical module has an entry/exit opening for, and shared by, the illumination light and the scattered and/or fluorescent light.

12. The optical module as recited in claim 10, further comprising at least one wavelength-selective optical element which has different transmission and/or reflection properties for the illumination light that differ from the transmission and/or reflection properties for the fluorescent light.

13. A confocal microscope comprising a mechanical holding device which holds therein the optical module according to claim 10.

14. The optical device as recited in claim 1, wherein the detection path and the illumination path are oriented substantially at an angle of 90 degrees relative to each other, and wherein the at least one attachment is only one attachment which is disposed in only one of the illumination path or the detection path.

15. The optical device as recited in claim 1, wherein the optical illumination assembly comprises a first objective, the optical detection assembly comprises a second objective, and the attachment comprises a non-imaging optical object, and wherein the illumination path is defined by optical elements of the first objective and extends from the first objective to the sample volume, and the detection path is defined by optical elements of the second objective and extends from the second objective to the sample volume.

16. The optical device as recited in claim 15, wherein a front of the second objective is immersed in an immersion medium that embeds the sample volume.

17. The optical device as recited in claim 16, wherein a front of the first objective is above the immersion medium that embeds the sample volume, or is only partially immersed in the immersion medium.

18. The optical device as recited in claim 8, wherein a surface of the transparent element toward the sample volume is immersed in an immersion medium that embeds the sample volume.

19. An optical device for illuminating a sample located in a sample volume with illumination light and for detecting scattered and/or fluorescent light from the sample, the device comprising:
   an optical illumination assembly comprising one or more first lenses and configured to transmit the illumination light along an illumination path into the sample volume;
   an optical detection assembly comprising a second lens that is separate from the one or more first lenses, the optical detection assembly being configured to collect and relay the scattered and/or fluorescent light from the sample volume along a detection path; and
   at least one attachment disposed along the illumination path between the optical illumination assembly and the sample volume, and/or along the detection path between the optical detection assembly and the sample volume,
   wherein the illumination path and the detection path terminate at the sample volume, and the detection path and the illumination path are not collinear with respect to each other,
   wherein the attachment is attached to the optical illumination assembly and/or to the optical detection assembly, and
   wherein the attachment has an input-side optical cross section and an output-side optical cross section, the input-side optical cross section being greater than the output-side optical cross section.

20. The optical device as recited in claim 19, wherein the attachment has an input-side optical cross section and an output-side optical cross section, the input-side optical cross section being greater than the output-side optical cross section.

21. The optical device as recited in claim 19, wherein the attachment is cup-shaped and opens toward the optical illumination assembly.

22. The optical device as recited in claim 19, wherein the attachment is a deflector that deflects the illumination light and/or the scattered and/or fluorescent light.

23. An optical device for illuminating a sample located in a sample volume with illumination light and for detecting scattered and/or fluorescent light from the sample, the device comprising:
   an optical illumination assembly comprising one or more first lenses and configured to transmit the illumination light along an illumination path into the sample volume;
   an optical detection assembly comprising a second lens that is separate from the one or more first lenses, the optical detection assembly being configured to collect and relay the scattered and/or fluorescent light from the sample volume along a detection path; and
   at least one attachment disposed along the illumination path between the optical illumination assembly and the sample volume, and/or along the detection path between the optical detection assembly and the sample volume,
   wherein the illumination path and the detection path terminate at the sample volume, and the detection path and the illumination path are not collinear with respect to each other,
   wherein the attachment has at least two interfaces which are oriented substantially perpendicular to the illumination path or to the detection path the attachment is disposed in, and
   wherein each of the at least two interfaces of the attachment are arranged in a sequential manner with respect to each other in the respective illumination path or detection path.

* * * * *